Patented Dec. 20, 1927.

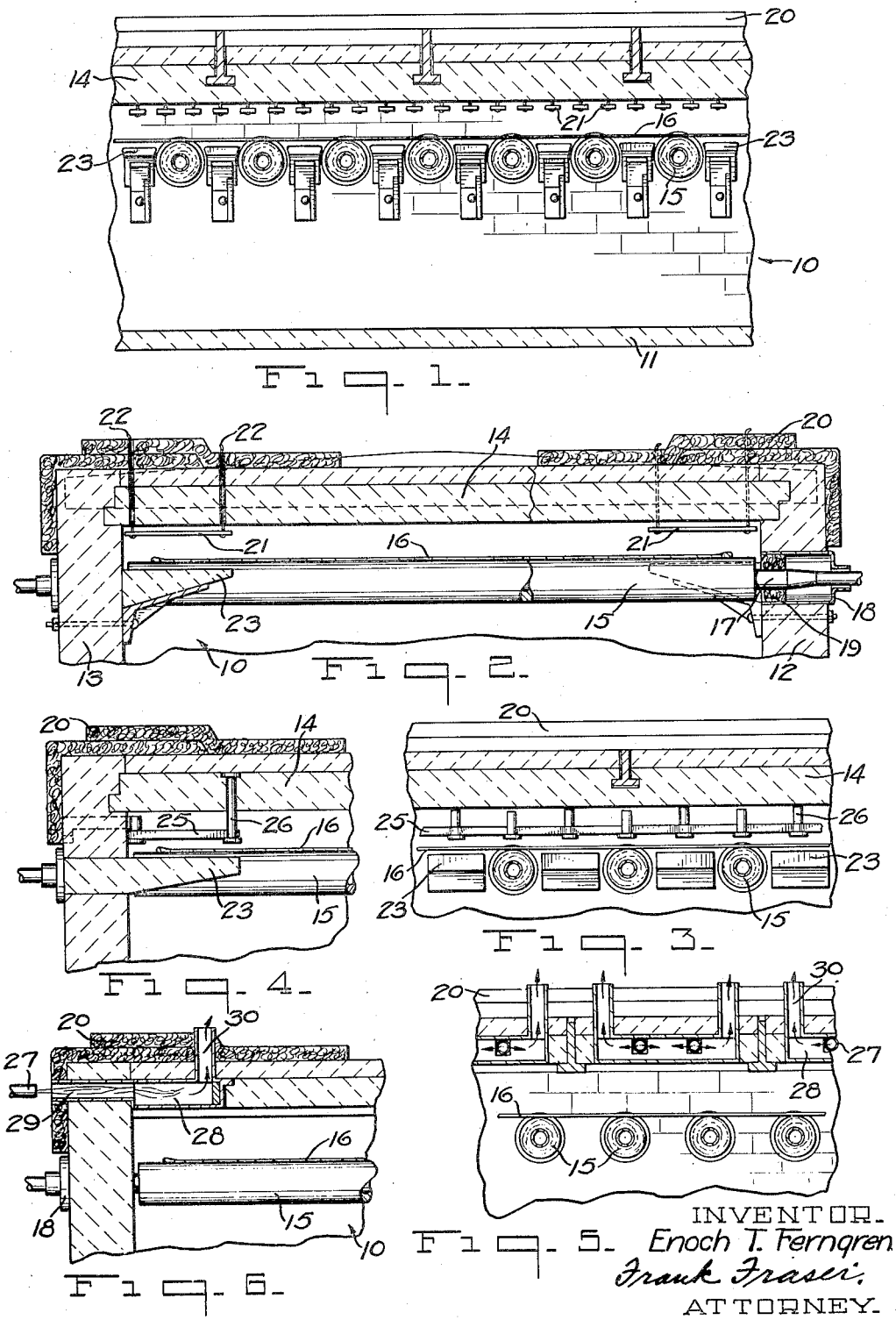

1,653,042

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

LEER-HEATING MEANS.

Application filed January 2, 1926. Serial No. 78,773.

The present invention relates to sheet glass apparatus, and has particular reference to an annealing leer.

An important object of the invention is to provide sheet glass apparatus wherein the glass is passed through an annealing leer, the side portions of which are provided with heating means to compensate for the heat losses due to the dissipation through the side walls of the said leer.

Another object of the invention is to provide the sheet glass annealing leer of this character wherein heating means are arranged in proximity to and in spaced relation to the border portions of the said sheet of glass to prevent premature and irregular contraction in and through said borders and permit a uniform annealing of the sheet throughout its entire width.

Still another object of the invention is to provide a leer of this nature wherein a sheet of glass may be continuously passed therethrough to permit annealing, the side walls of the leer being suitably insulated to reduce heating losses therethrough, said leer having a plurality of heating elements arranged near the side walls and adapted to supply sufficient heat to the sheet being annealed to compensate for heat losses along its surfaces and reduce internal stresses or strains in said sheet during the gradual cooling thereof to permit uniform annealing throughout.

A further object of the invention is to create an envelope of relatively high heat around each opposite edge of sheet to keep the edge glass relatively soft and non-resisting during the final progressive setting or hardening of the sheet body, the glass comprising this body becoming hard and attaining its final volume and form at the median portion of sheet prior to the establishment of these conditions in the edge glass, the higher heat around the border and edges of sheet making it possible to maintain conditions relative of nonstress throughout the plane of the sheet body.

Other objects and advantages of the invention will become apparent during the course of the following description.

In the drawings wherein like numerals are employed to designate like parts throughout the same, Fig. 1 is a fragmentary vertical longitudinal section through one type of leer constructed in accordance with the present invention, Fig. 2 is a fragmentary transverse vertical section therethrough, Fig. 3 is a fragmentary sectional view of a slightly modified construction, Fig. 4 is another view of the apparatus shown in Fig. 3, Fig. 5 is a sectional view of still another type, and Fig. 6 is a transverse sectional view of the type shown in Fig. 5.

The present invention is particularly well adapted for the production of flat sheet glass, although it is not necessarily restricted to this particular form of glass.

In accordance with the Colburn Patent 1,248,809, granted Dec. 4, 1917, a sheet of glass is continuously drawn from a molten mass, and after being suitably flattened, is passed through an annealing leer to relieve strains and permit the sheet to be used at various temperatures without breakage due to internal strains. Ordinarily the sheet, when entering the annealing leer, is quite hot, and in addition to the heat of the sheet the leer is heated by burners so that the sheet is not passed into a chamber whose temperature is much cooler than the chambers in which the sheet is formed. The temperature of the leer is gradually reduced until the sheet passes out of the leer where it can be handled very easily.

In the Colburn type of machine it is customary to use some form of edge forming means such as rotatable knurled internally cooled rollers which engage the edges of the sheet at the sheet forming meniscus. The knurled rolls are used to prevent the sheet from narrowing at its base. As the rolls are cooled and as they create sufficient drag upon the sheet to prevent narrowing a relatively thick edge is formed. This thickened edge is not uniform in thickness either throughout its own width, nor regards the thickness of the sheet. To permit proper annealing it is a difficult matter to establish a temperature in the leer which will give proper and uniform annealing throughout the entire width of sheet.

Another cause for trouble is the heat losses through the side walls of the leer and through the openings in which are arranged the leer roll shafts.

In the drawings the numeral 10 designates an annealing leer in its entirety, comprising the floor 11, side walls 12 and 13 and roof 14. Arranged within the leer is a plurality of rolls 15 which support and carry the sheet 16 through the leer. The rolls 15 may be formed from a suitable metal which may or may not be covered with asbestos or other protective means. They are supported and driven through means of the shafts 17 connected to some form of motive power. In the present construction a hood 18 is arranged around the shaft 17 and includes an insulating disc or washer 19 to prevent as far as possible loss of heat through the openings.

The upper portions of the side walls 12 and 13 and a portion of the roof 14 are provided with an insulating material 20. The insulating material 20 may vary in thickness as desired so that greatest insulation will be had where the greatest heat loss normally takes place.

Arranged within the leer, preferably along the side portions thereof and above the rolls 15, is a plurality of heating units 21. As shown in Figs. 1 and 2, the heating units 21 are resistance bars which may be supported by the insulated wires 22 through which means electrical energy may be supplied to the bars to create the heat necessary for proper annealing. The size and shape of the bars 21 may vary, the form shown in the drawings being by way of illustration. As shown in Fig. 1, the resistance units 21 are arranged relatively close together and fairly close to the sheet 16 which is being annealed. The heating members are preferably disposed above the sheet. Arranged between the supporting and conveying rolls 15 are reflector members 23, causing heat coming from the resistance bars 21 to be conducted, convected and radiated back toward the sheet and into the rolls 15 so that the sheet will be heated from both sides. The sheet normally is hotter and more plastic in the center as the edge portions will lose a certain amount of heat all the way through from the drawing machine because of its proximity to the walls, the outer faces of which are exposed to the room temperatures. As the side portions of the leer normally become cooler than the central portions, the resistance units 21 or other forms of heating members need extend only a relatively short distance inwardly of the leer. The temperature of these members should be controlled to take care of the normal heat losses so that the resultant temperature will be of a nature to uniformly anneal the sheet throughout its width.

In Figs. 3 and 4, the construction is varied to the extent that the resistance member 25 is a continuous ribbon laced around the depending insulators 26. The principle is the same as involved in the construction shown in Figs. 1 and 2. In Figs. 5 and 6, gas burners 27 are utilized, the flames being received within a box-like chamber 28 having an inlet 29 and an exit 30.

The form of insulating material used on the outside of the leer and the construction of the heating members may be varied to suit conditions. The temperature of the heating members will vary with the thickness of sheet being drawn, although the principle involved is the same in all cases. By controlling the temperature in accordance with the present invention losses due to breakage in the leer would be considerably reduced, as the possibilities of setting up strains due to improper annealing is reduced to a minimum.

The members 23 also function to retard air movement across the edges of sheet and to separate the heat pressure condition above the sheet level from those beneath the rolls 15.

Each member 23 as placed acts to spread heat into the thereto adjacent ends of rolls 15 and the atmosphere which tends to move either upward or downward at edges of sheet between these rolls, thus giving more equal heat condition in a reflecting sense of the heat delivered by each unit 21.

I claim:

1. In an annealing leer, means for supporting a sheet therein, and heating members above the sheet for directing heat along the border portions of said sheet to effect a localized heating thereof.

2. In an annealing leer, means for supporting a sheet therein, and electrical resistance units arranged above the sheet for causing the localized heating of the border portions thereof.

3. In an annealing leer, means for supporting a sheet therein, and heating members arranged over and in spaced relation but in close proximity to the edges of said sheet only.

4. In an annealing leer, means for supporting the article to be annealed, means for heating the border portions of the article, and a plurality of members arranged on the opposite side of the article to confine the heat.

5. In an annealing leer, means for supporting the article to be annealed, and a plurality of heating means suspended in proximity to the side walls thereof.

6. In an annealing leer, means for supporting the article to be annealed, and a plurality of electrical resistance units suspended in proximity to the side walls of said leer.

7. In an annealing leer, rolls for supporting a sheet of glass to be annealed, means for applying heat above the sheet, and means between the rolls to reflect heat toward said glass sheet.

8. In a sheet glass annealing leer, a plurality of rolls for supporting the sheet, heating means arranged in proximity to the border portions of the sheet, and means between the rolls for reflecting heat toward the sheet.

9. In a sheet glass annealing leer, means for supporting the sheet, electric resistance units above the sheet and reflectors below the sheet.

10. The method of annealing a flat horizontal drawn glass sheet, which consists in providing heat within the atmosphere of a leer above the border portions of the sheet carried therein, and in causing the heat which passes through the sheet to be reflected back thereto.

11. The method of dividing the upper portion of heating atmosphere from the lower, in a sheet glass annealing leer, through which the sheet is carried, which consists in providing heat retaining members beneath the edges of sheet, and in heating the atmosphere in the space above the edges of said sheet.

12. In an annealing leer, means for supporting a sheet therein, and a plurality of heating members arranged above and extending across the edge portions of said sheet only.

13. In an annealing leer, means for supporting a sheet therein, and a horizontal heating member positioned over and spaced from said sheet to effect a localized heating of the edges thereof.

14. In an annealing leer, means for supporting a sheet therein, and electrical resistance units arranged over the edges of said sheet only to effect a localized heating thereof.

15. In an annealing leer, means for supporting the article to be annealed, means above the article for heating the border portions thereof, and a plurality of members arranged beneath the article to confine the heat.

16. In an annealing leer, means for supporting the article to be annealed, a plurality of members above the article for heating the border portions thereof, and a plurality of reflectors beneath said article and spaced therefrom.

17. In an annealing leer, means for supporting a sheet of glass therein, means for applying heat above the sheet, and means beneath the sheet independent of said supporting means to reflect heat towards said sheet.

18. In a sheet glass annealing leer, means for supporting a sheet therein, heating means above the sheet, and reflectors below the sheet and spaced therefrom.

19. In an annealing leer, means for supporting a sheet therein, and a plurality of horizontal electrical resistance units suspended above the sheet and extending across the edge portions thereof only.

Signed at Toledo, in the county of Lucas, and State of Ohio, this 30th day of December, 1925.

ENOCH T. FERNGREN.